D. S. WING & HENRY GREEN.

Improvement in Potato Diggers.

No. 123,966. Patented Feb. 20, 1872.

Witnesses
T. A. Connolly
F. B. Curtis

Inventors
D. S. Wing
Henry Green
Chipman Hosmer & Co.
Attys 123,966

UNITED STATES PATENT OFFICE.

DANIEL S. WING AND HENRY GREEN, OF ROME, NEW YORK.

IMPROVEMENT IN POTATO-DIGGERS.

Specification forming part of Letters Patent No. 123,966, dated February 20, 1872.

*To all whom it may concern:*

Be it known that we, DANIEL S. WING and HENRY GREEN, of Rome, in the county of Oneida and State of New York, have invented a new and valuable Improvement in Potato-Diggers; and we do hereby declare that the following is a full, clear, and exact description of the construction and operation of the same, reference being had to the annexed drawing making a part of this specification, and to the letters and figures of reference marked thereon.

Figure 1:
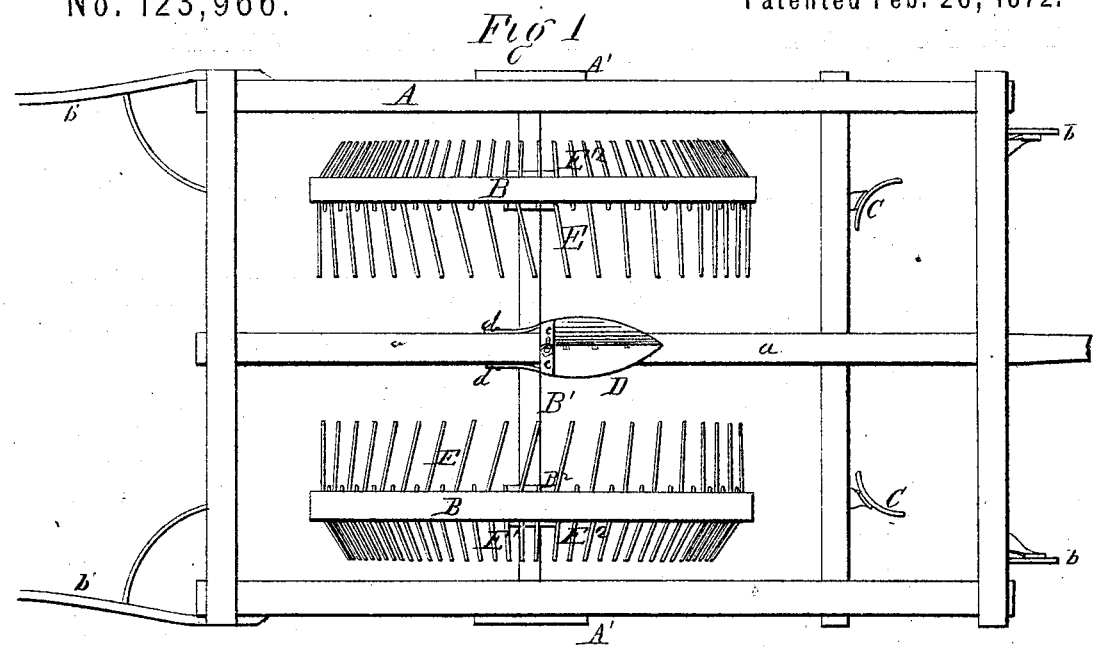
Figure 2:
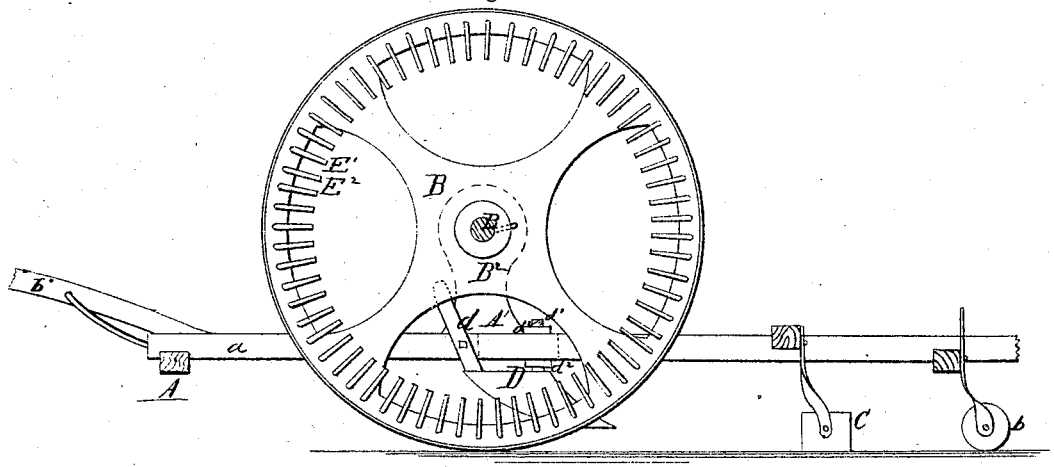

Figure 1 of the drawing is a representation of an under-side plan view of our invention. Fig. 2 is a vertical longitudinal section of the same.

This invention has relation to potato-diggers; and consists in the construction and novel arrangement of devices by means of which the potato-hills are opened, the potatoes separated from the earth, and gathered in hills on the surface in the rear of the separators.

Referring to the accompanying drawing, A represents a rectangular frame, supported by the separating-wheels B B, and provided with the caster-wheels $b$ $b$ and the guiding-handles $b'$. C designates reversible mold-board plows, secured to the frame A in front of the wheels B B. They are employed for the purpose of removing obstructions during the work of digging potatoes; also, by proper adjustment, as devices for cultivating, gathering the earth into hills, &c. D represents a plow attached to the central longitudinal beam $a$ of the frame A, and arranged between the wheels B B. Its function is to open the potato-hills and to throw their contents to either side. It has two mold-boards, which are hinged together and adjusted to different-sized hills by means of the regulating-arms $c$ $c$, one of which is slotted, and connected to the other by a pin or screw-bolt. $d$ $d$ represent the rear standards of the plow D, pivoted to the beam $a$. $d^1$ represents the forward standard, which passes through a longitudinal slot in the beam $a$, and holds a nut, $d^2$, both above and below the beam $a$. It is so arranged in order to allow of the adjustment of the plow to different depths and positions. E represents separating-teeth, which project inwardly from the rims of the wheels B B, and are bent slightly, as shown. Their tendency is to rake and separate the potatoes from the upturned soil, and to deposit them in a row behind the plow D. The teeth E pass through the rims of the wheels B B some distance beyond the outer faces thereof, as shown at $E^1$, and are bent inwardly, so as to form a guard to prevent the potatoes from being thrown outside the wheels. For the more effectual accomplishment of this purpose, other teeth, $E^2$, may be attached to the rims of the wheels, as shown in the drawing, their inner ends projecting slightly beyond the inner faces of the wheels B B. The wheels B B are journaled to a transverse shaft, $B^1$, and held in position by means of collars $B^2$ on each side of both wheels. By loosening and moving these collars, the positions of the wheels may be changed to lessen or increase their distance apart. The shaft $B^1$ is supported on the frame A by means of standards A'.

The implement as described may be used in digging pea-nuts.

I claim as my invention—

1. In a pea-nut or potato digger, the separating-wheels B B, armed with the inner and outer rows of teeth E $E^1$ and $E^2$, arranged, in relation to each other and to the plow D, as and for the purpose specified.

2. The improved plow D, hinged to the frame A of a potato or pea-nut digger, and rendered vertically, longitudinally, and laterally adjustable, as described.

3. In a potato or pea-nut digger, the combination of the hinged mold-boards, constituting the plow D, the pivoted standard $d$, vertical standard $d^1$, nuts $d^2$, and slotted beam $a$, as and for the purpose described.

4. The wheels B, armed with the teeth E, and rendered laterally adjustable on the shaft $B^1$, as described.

In testimony that we claim the above we have hereunto subscribed our names in the presence of two witnesses.

DANIEL S. WING.
HENRY GREEN.

Witnesses:
ORSON H. WHEELER,
THOMAS C. WILDS.